May 17, 1932. P. RILEY 1,859,171

CHANGE SPEED GEAR

Filed Oct. 24, 1930

Inventor:
Percy Riley,
By Mawhinney & Mawhinney,
Attys.

Patented May 17, 1932

1,859,171

UNITED STATES PATENT OFFICE

PERCY RILEY, OF HILL WOOTTON, WARWICK, ENGLAND

CHANGE-SPEED GEAR

Application filed October 24, 1930, Serial No. 491,005, and in Great Britain November 13, 1929.

This invention relates to change-speed gear mechanism, particularly for motor-vehicles, of the kind having co-axial driving and driven shafts and two parallel layshafts, and it has for its object to provide a very compact gear arrangement of which one forward speed comprises a direct drive while two other forward speeds, that is, speeds in the same direction, will be taken solely through constant-mesh pinions. These, as will be well understood, can be made as herringbone, helical, or the equivalent gears so as to be relatively silent in operation.

According to this invention, the lay-shafts are constantly connected, respectively, with the co-axial shafts each by a constant-mesh gear-pair, and selective means are arranged for directly connecting the co-axial shafts together, to give one speed, or for connecting either of the layshafts by a constant-mesh gear-pair to the co-axial shaft to which it is not constantly connected, to give two other speeds. The selective means preferably take the form of sliding dog clutches, one on the lay-shaft which is directly connected to the driving shaft, and the other a double-acting one on the driving shaft.

In the accompanying drawings:—

Figure 1:
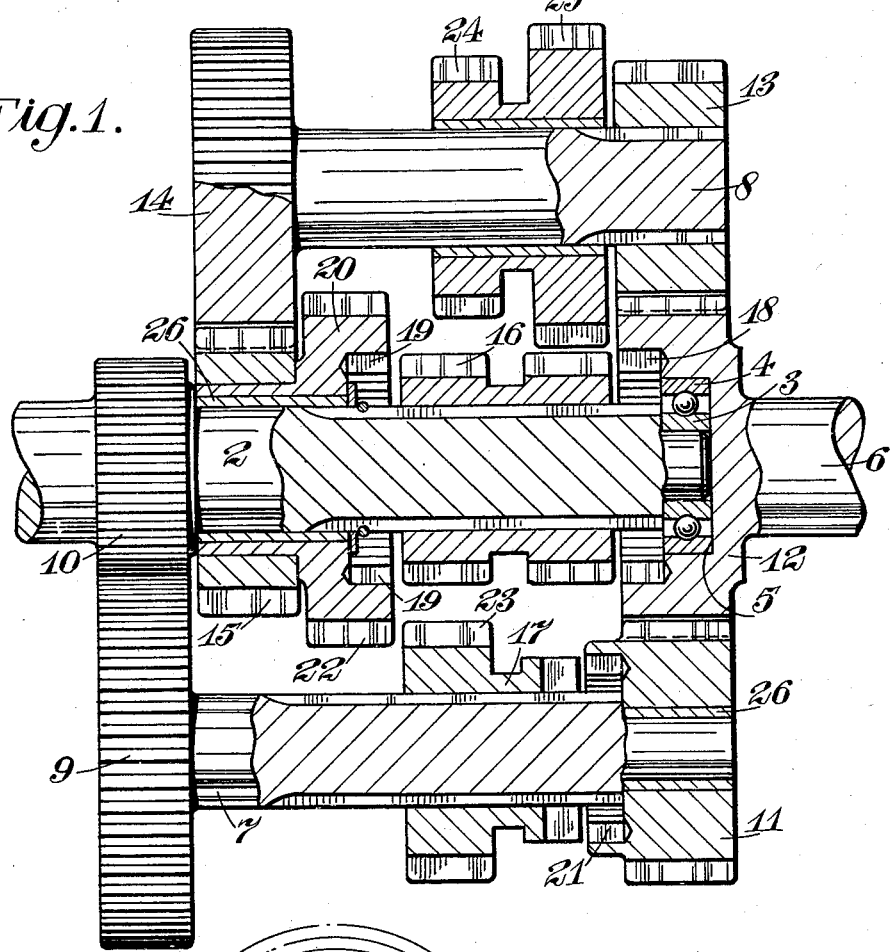
Figure 2:
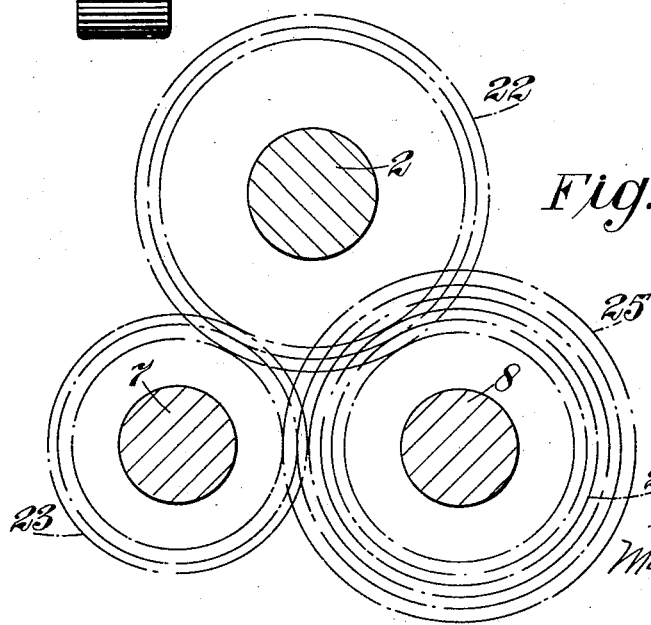

Figure 1 is a diagrammatic sectional view of one form of gear mechanism according to the invention, in which the casing is omitted and the lay-shafts are shown on opposite sides of the co-axial shafts for the sake of clearness, and Figure 2 is an end view of the shafts as actually arranged, only certain of the gears being shown in outline.

In the construction illustrated, as applied to a gear-box for a motor-vehicle, the rear end of the driving shaft 2 is inserted in the inner ring 3 of a ball-race the outer ring 4 of which is carried in a recess 5 at the front end of the driven shaft 6. The two lay-shafts 7, 8 are disposed below and parallel to the rear part of the driving shaft, one on each side of the vertical plane through the axis thereof, as indicated by Figure 2.

One of the lay-shafts 7, hereinafter referred to as the "driving" lay-shaft, has fixed on its front end a gear wheel 9 meshing with a pinion 10 fixed on the driving shaft. The rear end of the "driving" lay-shaft carries a freely-rotatable pinion 11 meshing with a gear 12 fixed on, or formed integrally with, the driven shaft, the above-mentioned recess 5 preferably being formed internally of this latter gear.

The other lay-shaft 8, hereinafter referred to as the "driven" lay-shaft, carries at its rear end a fixed pinion 13 meshing with the gear 12 on the driven shaft and at its forward end a fixed gear wheel 14 meshing with a pinion 15 which is rotatable upon the driving shaft.

The driving shaft and the "driving" lay-shaft are both splined and carry sliding dog clutches 16, 17, respectively through which the speed changes can be effected.

The sliding dog clutch 16 on the driving shaft is axially movable to engage dogs 18 on the driven shaft. These are preferably internal dogs formed on the gear 12 as shown. When the sliding dog clutch is in this meshing position, top speed will be obtained, the drive then being direct from the driving shaft to the driven shaft through the spline on the driving shaft, the sliding dog clutch thereon and the fixed dogs on the driven shaft, in the well known manner.

A second sliding dog clutch on the driving shaft, or preferably the other end of the dog clutch 16, is arranged to engage with the dogs 19 on the pinion 15. Preferably these latter dogs are internally-formed on a rearward extension 20 of this pinion, the extension either being integral or firmly united to the pinion. Thus, when the sliding dog clutch is slid forwardly to engage the dogs carried by the pinion 15, 20 the next speed is obtained, the power then being transmitted from the driving shaft by way of the spline thereon to the sliding dog clutch thereon, to the dog teeth 19, to the gear wheel 14 fixed on the "driven" lay-shaft, and thence through the constantly-connected gear-pair 13, 12, to the driven shaft.

When the sliding dog clutch 16 on the driving shaft is disengaged from both the co-operating dogs, the next speed can be obtained by sliding the dog clutch 17 on the "driving" lay-shaft rearwardly into mesh with dogs 21 formed on the rotatable pinion 11, these latter dogs preferably being internally formed on a forward extension thereof. In this case the drive is taken from the driving shaft through the constantly-connected gear-pair 10, 9, to the "driving" lay-shaft, and from the spline thereon through the dog clutch 17 to the rotatable pinion 11 which continuously meshes with the gear 12 fixed on the driven shaft.

With the above arrangement all three speed changes are obtained by means of sliding dogs, and consequently the meshing gears may be helical gears which are singularly noiseless in operation.

In cases when a fourth forward speed is desired, for example, a low emergency gear, the extension 20 may be provided with straight external teeth 22 adapted to mesh with an externally-toothed pinion 23 splined on the "driving" lay-shaft and shown formed integrally with the sliding dog clutch 17 thereon for movement therewith. When these two gear wheels forming an intermediate gear-pair are engaged, the power is transmitted from the driving shaft to the "driving" lay-shaft through the constant-mesh gear-pair 10, 9, then through the spline and through the intermediate gear-pair 23, 22 to the pinion 15, and from the "driven" lay-shaft to the driven shaft by means of the constantly-connected gear-pair 13, 12. By this arrangement, involving transmission of power through four gear-pairs, a considerable reduction of gear-ratio for use in emergency can be obtained.

With the above arrangement a reverse gear may be obtained by means of two interconnected toothed wheels 24, 25 freely rotatable on and slidable along the "driven" lay-shaft, these being movable to engage, respectively, the two gear wheels 22, 23 when they are out of mesh (see Figure 2). In this case the power is transmitted from the driving shaft to the "driving" lay-shaft 7, from there through the gear-pairs 23, 25 and 24, 22 to the pinion 15 freely rotatable on the driving shaft, and thence by the above-described connections through the "driven" lay-shaft to the driven shaft.

With arrangements according to this invention, the gear-box of a motor-vehicle can be made extremely compact for the reason that the shaft portions carrying gear-wheels are quite short, and the ratios of all the co-operating pairs of gear-wheels are small. Top (fourth) speed is direct and third and second speeds are each through two reductions, whilst first speed is through four reductions. The use of sliding dogs for effecting the engagement of second, third and fourth speeds means that the changing of these speeds becomes a very easy matter. Furthermore, the second and third speeds, which are more important than the first speed, can have their freely rotatable gear-wheels mounted on bushes 26, 26 on the respective shafts, an arrangement which is easier to carry out efficiently than when splining has to be effected.

What I claim as my invention and desire to secure by Letters Patent of the United States is:—

1. Change-speed gear mechanism comprising coaxial driving and driven shafts, two lay-shafts parallel thereto, a constant-mesh gear train constantly connecting the driving shaft to one of the layshafts, a constant-mesh gear train between this latter lay-shaft and the driven shaft, a sliding dog clutch for bringing this latter gear train into and out of operation, a constant-mesh gear train constantly connecting the driven shaft to the other of the lay-shafts, a constant-mesh gear train between this latter lay-shaft and the driving shaft, a sliding dog clutch for bringing this latter gear train into and out of operation, a sliding dog clutch for connecting the driving and driven shafts directly together, said two last mentioned sliding dog clutches having a common member slidable on the driving shaft.

2. Change-speed gear mechanism comprising coaxial driving and driven shafts, means for locking the shafts together, a gear wheel fast on the driving shaft, a gear wheel free on the driving shaft, means for locking the free gear wheel to the driving shaft, a gear wheel fast on the driven shaft, a lay-shaft, a gear wheel fast on the lay-shaft and constantly in mesh with the gear wheel fast on the driving shaft, a gear wheel free on the lay-shaft and constantly in mesh with the gear wheel on the driven shaft, means for locking the gear wheel free on the layshaft to the lay-shaft, a second lay-shaft, two gear wheels fast on the latter lay-shaft and constantly in mesh, respectively, with the gear wheel free on the driving shaft and the gear wheel on the driven shaft.

3. Change-speed gear mechanism comprising coaxial driving and driven shafts, means for locking the shafts together, a gear wheel fast on the driving shaft, a gear wheel free on the driving shaft, means for locking the free gear wheel to the driving shaft, a gear wheel fast on the driven shaft, a lay-shaft, a gear wheel fast on the lay-shaft and constantly in mesh with the gear wheel fast on the driving shaft, a gear wheel free on the lay-shaft and constantly in mesh with the gear wheel on the driven shaft, means for locking the gear wheel free on the layshaft to the lay-shaft, a second lay-shaft, two gear wheels fast on the latter lay-shaft and constantly in mesh, respectively, with the gear wheel free on the driving shaft and the gear wheel on the driven shaft, a further gear wheel fixed to the gear wheel which is free on the driving shaft, a gear wheel non-rotatably mounted on said first-mentioned lay-shaft and slidable into and out of mesh with said further gear wheel.

4. Change-speed gear mechanism comprising coaxial driving and driven shafts, means for locking the shafts together, a gear wheel fast on the driving shaft, a gear wheel free on the driving shaft, means for locking the free gear wheel to the driving shaft, a gear wheel fast on the driven shaft, a layshaft, a gear wheel fast on the lay-shaft and constantly in mesh with the gear wheel fast on the driving shaft, a gear wheel free on the lay-shaft and constantly in mesh with the gear wheel on the driven shaft, means for locking the gear wheel free on the layshaft to the lay-shaft, a second lay-shaft, two gear wheels fast on the latter lay-shaft and constantly in mesh, respectively, with the gear wheel free on the driving shaft and the gear wheel on the driven shaft, a further gear wheel fixed to the gear wheel which is free on the driving shaft, a gear wheel non-rotatably mounted on said first-mentioned lay-shaft and slidable into and out of mesh with said further gear wheel, a compound gear wheel free on said second-mentioned lay-shaft, the compound gear wheel being adapted to mesh both with said further gear wheel and with the gear wheel slidable on said first-mentioned lay-shaft.

In testimony whereof I affix my signature.

PERCY RILEY.